United States Patent
Thankachan et al.

(10) Patent No.: US 10,713,706 B1
(45) Date of Patent: Jul. 14, 2020

(54) MULTI-MODEL PREDICTION AND RESOLUTION OF ORDER ISSUES

(71) Applicant: EMC IP Holding Company LLC, Hopkinton, MA (US)

(72) Inventors: Karun Thankachan, Karnataka (IN); Venkata ChandraSekarRao, Karnataka (IN); Abhishek Gupta, Karnataka (IN); Arvind Babu, Karnataka (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 159 days.

(21) Appl. No.: 15/883,457

(22) Filed: Jan. 30, 2018

(51) Int. Cl.
*G06Q 30/00* (2012.01)
*G06Q 30/06* (2012.01)
*G06N 5/02* (2006.01)
*G06N 7/00* (2006.01)

(52) U.S. Cl.
CPC ......... *G06Q 30/0635* (2013.01); *G06N 5/022* (2013.01); *G06N 7/005* (2013.01)

(58) Field of Classification Search
None
See application file for complete search history.

(56) References Cited

U.S. PATENT DOCUMENTS

| 2015/0046361 A1* | 2/2015 | Williams | G06Q 10/083 705/330 |
| 2019/0213509 A1* | 7/2019 | Burleson | G06N 20/00 |
| 2019/0220827 A1* | 7/2019 | Cogill | G06F 17/18 |

* cited by examiner

*Primary Examiner* — Mila Airapetian
(74) *Attorney, Agent, or Firm* — Ryan, Mason & Lewis, LLP

(57) ABSTRACT

Techniques are provided for multi-model prediction and resolution of order issues. An exemplary method for predicting issues that will delay an order comprises: obtaining features of the order; processing the features using a multi-model predictor to predict the issues that will delay the order, wherein the multi-model predictor comprises a first model that determines a probability that the order will be delayed and a second model that determines a probability that the order will be delayed for each of a plurality of different predefined order issue types; and aggregating an output of the first and second models to provide a likelihood of the issues that will delay the order. The multi-model predictor also optionally comprises a prediction model that predicts a number of the delay issues for a future time period and/or a cost of the delay issues for different predefined order issue types based on historical data.

20 Claims, 17 Drawing Sheets

*FIG. 3B*

ACCOUNT RECEIVABLES DATA
350

| CUSTOMER NO | CUSTOMER NAME | INVOICE NUMBER | POSTING DATE | DUE DATE | PAYMENT DATE | AMOUNT | STATUS | DUE CROSSED |
|---|---|---|---|---|---|---|---|---|
| 1013456 | US BANK | 90003251 | 12/10/2016 | 1/9/2017 | | 322145 | OPEN | Y |
| 1202123 | ABC CONSULTANCY | 90003252 | 1/1/2016 | 3/1/2016 | 2/20/2016 | 128956 | CLOSED | N |
| 2130912 | AIR COMPANY | 90003253 | 7/1/2016 | 8/15/2016 | 9/6/2016 | 236745 | CLOSED | Y |

*FIG. 3C*

TRANSACTION RECORDS
360

| ORDER ID | CUSTOMER | AMOUNT | SOLD_TO_PARTY | SHIP_TO_PARTY | ADDRESS | PRODUCT | PAYMENT_CHANNEL | SALES REP | TAX_AMOUNT |
|---|---|---|---|---|---|---|---|---|---|
| 2012345 | US BANK | 1234 | 1000121 | 1000124 | xyz ROAD | LATITUDE | CREDIT_CARD | 1234 | 12.1 |
| 2134567 | ABC CONSULTANCY | 2313 | 1000123 | 1000125 | anc ROAD | POWEREDGE | NET BANKING | 2314 | 2.3 |
| 1896745 | BOEING | 1245 | 1000126 | 1000127 | pqr ROAD | ALIENWARE | DEBIT CARD | 1567 | 1.2 |

*FIG. 3D*

TRANSACTION HOLD TYPES
370

| ORDER ID | HOLD_TYPE | HOLD DATE | RELEASE DATE |
|---|---|---|---|
| 2012345 | CREDIT_CARD_HOLD | 1/2/2107 | 1/3/2017 |
| 2012345 | PAST PAYMENT HOLD | 1/3/2017 | 1/4/2017 |
| 2134567 | SALES REP HOLD | 3/1/2017 | 3/2/2017 |
| 2134567 | PO HOLD | 3/2/2017 | 3/3/2017 |

*FIG. 4 cont.*

| DP Id | Customer N.. | SKU Numb.. | PO Number | si_number | Sales Re.. | Distance |
|---|---|---|---|---|---|---|
| | | | | | | 450 |
| 2005799961823 | 119461540 | A7134886 | 4.24Badger736.. | UNKNOWN | 93530 | 1,610,612,736 |
| | | | 5.15BadgerMe.. | UNKNOWN | 93530 | 470 536,870,912 |
| 2005773333981 | | | 46239925 | UNKNOWN | 56347 | 1,968,526,678 |
| | 27917491 | 210-AFGK | 46239927 | UNKNOWN | 56347 | 1,073,741,824 |
| 2005773351306 | | | 46243458 | UNKNOWN | 56347 | 178,956,970 |
| 2005773361446 | 134559599 | 450-AEUO | 12086 | UNKNOWN | 158061 | 1,288,490,198 |
| | 2147483647 | 210-ACQN | GKentLauren | UNKNOWN | 999 | 1,073,741,960 |
| 2005774419649 | 1171463 | 210-AIYE | 4700135437 | B9L32 | 144766 | 1,073,741,917 |
| | 1074478323 | 998-BUCW | Farabaughlr | UNKNOWN | 167621 | 1,073,741,915 |
| 2005774435884 | 2147483647 | 452-BCYT | BannerjoMari | UNKNOWN | 999 | 1,073,741,908 |
| | 14822478 | 391-BCEV | 5IS170030 | B8WK08 | 30054 | 1,073,741,886 |
| 2005774780784 | 111751229 | 451-BBPK | 135441/10015.. | BGQF18 | 10156 | 1,073,741,871 |
| 2005774786666 | 2147483647 | 210-AFLI | OxfordParlorof.. | UNKNOWN | 193567 | 1,073,741,865 |
| | 2147483647 | 210-AGMV | OxfordParlorof.. | UNKNOWN | 193567 | 1,073,741,865 |
| 2005774832445 | 2147483647 | A9272669 | OxfordParlorof.. | UNKNOWN | 193567 | 1,073,741,865 |
| | 143284720 | 346BBRQ | INCGB0048947.. | B4NZ71 | 43714 | 1,073,741,865 |
| 2005777650984 | 2147483647 | 998-CLPR | rziobronfredd | UNKNOWN | 999 | 1,073,741,842 |

FIG. 5A

Multi-Variate Logistic Regression Process

Through multivariate logistic regression, find probability of an order going on hold.
$G(y) = B0 + B1(\text{customer\_number}) + B2(\text{Backend\_company}) + B3(\text{Amount}) + B4(\text{tax\_amnt}) + B5(\text{salesrep\_num}) + B6(\text{sku\_number}) + B7(\text{po\_number}) + B8(\text{ship\_contact\_id}) + B9(\text{bill\_contact\_id}) + B10(\text{system\_integration\_number}) + B11(\text{Past due amount}) + B12(\text{credit\_balance}) + B13(\text{Tot\_past\_transactions}) + B14(\text{past\_credit\_card\_fail\_transactions})$
As $G(y)$ is either going on hold or not, so value is 0/1
Probability is positive, represented above equation in exponential form.
Representing:
$x = B0 + B1(\text{customer\_number}) + B2(\text{Backend\_company}) + B3(\text{Amount}) + B4(\text{tax\_amnt}) + B5(\text{salesrep\_num}) + B6(\text{sku\_number}) + B7(\text{po\_number}) + B8(\text{ship\_contact\_id}) + B9(\text{bill\_contact\_id}) + B10(\text{system\_integration\_number}) + B11(\text{Past due amount}) + B12(\text{credit\_balance}) + B13(\text{Toat\_past\_transactions}) + B14(\text{past\_credit\_card\_fail\_transactions})$
$P = e^x / 1 + e^x$,
where P is the probability of hold
$Q = 1 - P = 1 - (e^x / 1 + e^x)$
and Q is probability of not going on hold
$P/(1-P) = e^x$
$\text{Log}(P/(1-P)) = x$
$\text{Log}(P/(1-P)) = B0 + B1(\text{customer\_number}) + B2(\text{Backend\_company}) + B3(\text{Amount}) + B4(\text{tax\_amnt}) + B5(\text{salesrep\_num}) + B6(\text{sku\_number}) + B7(\text{po\_number}) + B8(\text{ship\_contact\_id}) + B9(\text{bill\_contact\_id}) + B10(\text{system\_integration\_number}) + B11(\text{Past due amount}) + B12(\text{credit\_balance}) + B13(\text{Toat\_past\_transactions}) + B14(\text{past\_credit\_card\_fail\_transactions})$ If log of ratio is more than 50% then there is a chance that respective order may go on hold.

*FIG. 5B*   LOGISTIC REGRESSION INPUTS  530

| ORDER ID | CUSTOMER_NUMBER | AMOUNT | TAX_AMNT | SALESREP_NUM | CREDIT_BAL | #_PAST_TRANSACTIONS | PAST_CREDICT_CARD_FAIL |
|---|---|---|---|---|---|---|---|
| 200580728078 | 2147483647 | 239 | 41.8 | 52336 | 8967 | 10 | 2 |
| 200577811038 | 146417322 | 2498 | 0 | 17772 | 10 | 8 | 0 |
| 200581106036 | 146927358 | 1062.5 | 0 | 17597 | 12345 | 2 | 0 |
| 200579879962 | 124918065 | 65353.5 | 0 | 68049 | 23786 | 1 | 1 |
| 200577661180 | 22154729 | 269.53 | 218.73 | 179233 | 238905 | 3 | 2 |
| 200579991422 | 4280083 | 1284.34 | 0 | 192556 | 12674 | 1 | 1 |
| 200579556194 | 137069148 | 1225 | 17.17 | 99252 | 34671 | 5 | 0 |
| 200579577046 | 136998789 | 165.28 | 0 | 172839 | 29864 | 20 | 1 |
| 200578634888 | 2169530 | 326.3 | 0 | 120384 | 1291 | 14 | 3 |
| 200580573562 | 145710231 | 524 | 72.24 | 188354 | 0 | 10 | 8 |

*FIG. 5C*   LOGISTIC REGRESSION OUTPUTS  560

| PROBABILITY_GOING_ON_HOLD |
|---|
| 30% |
| 89% |
| 22% |
| 99% |
| 89% |
| 98% |
| 43% |
| 38% |
| 42% |
| 95% |

*FIG. 6A*

XG Boost Process

To avoid over fitting and to consider all possible features, move to XG boost

Fit model to the data $y = f(x)$

Fit model to the residual $h1(x) = y - f(x)$

Now, new model = $f2(x) = f(x) + h1(x)$

In XG Boost, Idea is to create more models to correct the errors from the previous model.

For example:

Initial Model:

Tax_indicator = B0+ B1(customer_number) + B2(tax_amount) + B3(Backend_company)

Represent $f(x)$ = B0+ B1(customer_number) + B2(tax_amount) + B3(Backend_company)

Tax_indicator = $f(x)$

Residual error, while classifying, calculated as: Tax_indicator $-f(x)$

New model equation: $f2(x) = f(x) + $ (tax_indicator $-f(x)$)

Similar way for other features: pas_payment_indicator, cntact_indicator, sales_rep_ind, sku_ind, po_indicator, lead_time_ind, credit_card_ind, credit_check

- XG BOOST INPUTS — 630
- LOGISTIC REGRESSION INPUTS — 530
- LOGISTIC REGRESSION OUTPUTS — 560

XG BOOST OUTPUTS — 660

| TAX_INDICATOR | PAST_PAYMENT_IND | CNTACT_INDICATOR | SALES_REP_IND | SKU_INDICATOR | PO_INDICATOR | LEAD_TIME_IND | CREDIT_CARD_IND | CREDIT_CHECK |
|---|---|---|---|---|---|---|---|---|
| 1 | 0 | 0 | 0 | 0 | 0 | 0 | 0 | 0 |
| 0 | 1 | 0 | 0 | 0 | 1 | 0 | 0 | 1 |
| 0 | 0 | 0 | 0 | 1 | 0 | 0 | 0 | 0 |
| 0 | 1 | 0 | 0 | 0 | 0 | 0 | 1 | 1 |
| 0 | 0 | 0 | 1 | 0 | 0 | 1 | 1 | 1 |
| 0 | 0 | 1 | 0 | 0 | 0 | 0 | 0 | 0 |
| 0 | 0 | 0 | 0 | 0 | 0 | 0 | 0 | 0 |
| 0 | 0 | 0 | 0 | 1 | 0 | 0 | 1 | 0 |

IN SUPPORT VECTOR MACHINE, WITH HOLD ATTRIBUTES FROM PREVIOUS LAYER REPRESENTED IN HYPER PLANE, AND DRAW SUPPORT VECTORS TO DIFFERENTIATE HOLD VERSUS NO HOLD ORDERS. ONCE HOLD ORDERS ARE IDENTIFIED:

CALCULATE MEAN OF ALL FEATURES PER CUSTOMER, AND FIND OUT THE DISTANCE FROM EACH ORDER RELATED TO THAT CUSTOMER AS SHOWN ABOVE

SVM OUTPUTS

| TAX_INDICATOR_2 | PAST_PAYMENT_IND_2 | CNTACT_INDICATOR_2 | SALES_REP_IND_2 | SKU_INDICATOR_2 | PO_INDICATOR_2 | LEAD_TIME_IND_2 | CREDIT_CARD_IND_2 | CREDIT_CHECK_2 |
|---|---|---|---|---|---|---|---|---|
| 0.89 | 0.123 | 0.124 | 0.45 | 0.01 | 0.467 | 0.128 | 0.2345 | 0.123 |
| 0 | 0.8324 | 0.45 | 0.16 | 0.0456 | 0.8765 | 0.215 | 0.0001 | 0.8765 |
| 0 | 0.123 | 0.16 | 0.1 | 0.965 | 0.128 | 0.124 | 0.001 | 0.12 |
| 0 | 0.145 | 0.1 | 0.12 | 0.45 | 0.215 | 0.0785 | 0.95 | 0.7654 |
| 0 | 0.678 | 0.8324 | 0.7123 | 0.16 | 0.124 | 0.123 | 0.84 | 0.7432 |
| 0 | 0.215 | 0.123 | 0.41 | 0.12 | 0.45 | 0.876 | 0.95 | 0.123 |
| 0 | 0.124 | 0.145 | 0.034 | 0.7123 | 0.012 | 0.0123 | 0.0123 | 0.237 |
| 0 | 0.45 | 0.678 | 0.0123 | 0.034 | 0.1 | 0 | 0.0876 | 0.0123 |
| 0 | 0.16 | 0.0123 | 0.0652 | 0.0984 | 0.0678 | 0.09444 | 0.123 | 0.0876 |
| 0 | 0.1 | 0.14 | 0.0984 | 0.843 | 0.345 | 0.05627 | 0.8654 | 0.123 |

FIG. 8A

Auto Regressive Integrated Moving Average Process

1. Take data and plot it against time
2. Analyze the plot to see if it is stationary with time
3. If necessary, difference data until it appears stationary
4. Plot auto-correlation (ACF) and partial auto-correlation (PACF) of differenced data and estimate possible model parameters
5. Calculate Akaike Information Criteria (AIC) values for all model parameters to search for better model
6. Plot residual of model parameters obtained to verify that no lag occurs for them
7. If lag occurs in residual plot, try another estimated model parameters until a good residual plot is obtained
8. Once a good residual is obtained, calculate forecast.

FIG. 8B
830 — ARIMA INPUTS

| DATE | HOLD_TYPE | TIME_SPENT | AMOUNT | COUNT_OF_ORDERS | TYPE |
|---|---|---|---|---|---|
| 6/6/2017 | PaymentHold | 89441402 | 60806812.09 | 3130 | actual |
| 3/17/2017 | PaymentHold | 66999843 | 17991219.83 | 2664 | actual |
| 6/8/2017 | PendingOrderChangeHold | 13593606 | 11366347.4 | 130 | actual |
| 11/12/2017 | FraudHold | 10206778 | 7321480.03 | 5573 | actual |
| 3/28/2017 | FraudHold | 1355624938 | 100999901 | 25874 | actual |
| 5/19/2017 | FraudHold | 2470980522 | 149271529 | 23240 | actual |
| 8/22/2017 | QualityHold | 166648458 | 59524127.62 | 1130 | actual |
| 7/6/2017 | FraudHold | 31024278039 | 142928824.6 | 31061 | actual |
| 9/25/2017 | DynamicRulesManagerHold | 24255503 | 328646.71 | 381 | actual |
| 11/18/2017 | OCIHold | 22819864 | 838107.52 | 381 | actual |

FIG. 8C
860 — ARIMA OUTPUTS

| DATE | HOLD_TYPE | TIME_SPENT | AMOUNT | COUNT_OF_ORDERS | TYPE |
|---|---|---|---|---|---|
| 12/13/2017 | PendingOrderChangeHold | 7036877.66 | 2942393.897 | 622.5645 | Predicted |
| 12/19/2017 | OCIHold | 31975.911 | 12315.7597 | 15.1845 | Predicted |
| 12/12/2017 | PaymentHold | 107879917.7 | 18285290.32 | 1529.5853 | Predicted |
| 12/17/2017 | FraudHold | 2493347986 | 8227876.117 | 8979.101 | Predicted |
| 12/17/2017 | DynamicRulesManagerHold | 32059910.55 | 2236415.153 | 429.2152 | Predicted |
| 12/17/2017 | OCIHold | 5443251.033 | 36106347.53 | 2586.4265 | Predicted |
| 12/17/2017 | PaymentHold | 9283157.235 | 523610.9221 | 120.4637 | Predicted |
| 12/17/2017 | FraudHold | 1179854983 | 209669885.9 | 30688.8868 | Predicted |
| 12/18/2017 | DynamicRulesManagerHold | 245526.138 | 18473.28892 | 3.0369 | Predicted |
| 12/17/2017 | ProductValidatorHold | 6215.748 | 110227.32 | 3.0369 | Predicted |

FIG. 9A

```
Ensemble Process

Rather than making manual decisions, such as "if distance is >= 0.5,
then there is more probability of going on hold, else no hold,"

Ensemble Process derives new decisions based on voting
based ensemble algorithm, which works based on a combination
of both SVM and Gradient Boosting technique.

Estimators = []
Xg_boost_est = GradientBoostingRegressor(n_estimators = 100)
Xg_boost_est.fit(x_train, y_train)
Estimators.append('Gradientboost', Xg_boost_est)
Svm = svm.SVC()
Svm.fit(x_train, y_train)
Estimators.append('SVM', Svm)
Ensemble = VotingClassifier(Estimators)
Results = model_selection.cross_val_score(Ensemble, x_train, y_train)
Results.mean()
```

ENSEMBLE INPUTS — 930
SVM INPUTS — 730
SVM OUTPUTS — 760
ARIMA OUTPUTS — 860

ENSEMBLE OUTPUTS — 960

| TAX_INDICATOR_3 | PAST_PAYMENT_IND_3 | CNTACT_INDICATOR_3 | SALES_REP_IND_3 | SKU_INDICATOR_3 | PO_INDICATOR_3 | LEAD_TIME_IND_3 | CREDIT_CARD_IND_3 | CREDIT_CHECK_3 |
|---|---|---|---|---|---|---|---|---|
| 0.945 | 0.0615 | 0.062 | 0.225 | 0.005 | 0.2335 | 0.064 | 0.11725 | 0.0615 |
| 0 | 0.9162 | 0.225 | 0.08 | 0.0228 | 0.93825 | 0.1075 | 0.00005 | 0.93825 |
| 0 | 0.0615 | 0.08 | 0.05 | 0.9825 | 0.064 | 0.062 | 0.0005 | 0.06 |
| 0 | 0.0725 | 0.05 | 0.06 | 0.225 | 0.1075 | 0.03925 | 0.975 | 0.8827 |
| 0 | 0.839 | 0.4162 | 0.85615 | 0.08 | 0.062 | 0.0615 | 0.92 | 0.8716 |
| 0 | 0.1075 | 0.0615 | 0.205 | 0.06 | 0.225 | 0.938 | 0.975 | 0.0615 |
| 0 | 0.062 | 0.0725 | 0.017 | 0.35615 | 0.006 | 0.00615 | 0.00615 | 0.1185 |
| 0 | 0.225 | 0.839 | 0.00615 | 0.205 | 0.05 | 0 | 0.0438 | 0.00615 |
| 0 | 0.08 | 0.00615 | 0.0326 | 0.017 | 0.0339 | 0.04722 | 0.0615 | 0.0438 |
| 0 | 0.05 | 0.07 | 0.0492 | 0.9215 | 0.1725 | 0.028135 | 0.9327 | 0.0615 |

MULTI-MODEL PREDICTION AND RESOLUTION OF ORDER ISSUES

FIELD

The field relates generally to the prediction of problems with the processing of electronic commerce (e-commerce) orders.

BACKGROUND

Orders processed on e-commerce platforms typically undergo multiple validation phases before purchased items are produced and/or shipped to a customer. For example, validation may include validating the method of payment (e.g., whether payment is received or credit is approved), the product (e.g., whether an item is in stock or can be built) and/or the customer (e.g., whether the customer is a valid customer). Many e-commerce platforms deal with numerous scenarios, including a large number of customers, products and payment, which may lead to orders being placed on hold or otherwise delayed due to various validation issues. Orders failing validation may require manual intervention, engaging further resources, and additional time to resolve the issue. Delayed orders can lead to a poor customer experience, cancellation of orders and even subsequent loss or delay of revenue.

A need therefore exists techniques for predicting delays in order processing and for providing suggestions for mitigating the delays.

SUMMARY

In one embodiment, a method is provided for multi-model prediction and resolution of order issues. An exemplary method for predicting one or more issues that will delay an electronic commerce order comprises: obtaining a plurality of features of the electronic commerce order; processing the plurality of features using a multi-model predictor to predict the one or more issues that will delay the electronic commerce order, wherein the multi-model predictor comprises a first model that determines a probability that the electronic commerce order will be delayed and a second model that determines a probability that the electronic commerce order will be delayed for each of a plurality of different predefined order issue types; and aggregating an output of the first and second models to provide a likelihood of the one or more issues that will delay the electronic commerce order.

In some embodiments, the multi-model predictor further comprises a prediction model that predicts a number of delay issues for a future time period and/or a cost of the delay issues for the plurality of different predefined order issue types based on historical data. The exemplary multi-model predictor may also comprise a support vector machine model that calculates a mean of the plurality of features for a given customer, determines a distance of the mean from a plurality of orders of the given customer, and compares the distances to one or more predefined thresholds.

In one or more embodiments, feedback is provided to a customer, a sales agent and/or an order processing device regarding orders that are delayed. Proposed resolutions of the identified issues that will delay the electronic commerce order are optionally provided based on an analysis of historical transaction data.

Other illustrative embodiments include, without limitation, apparatus, systems, methods and computer program products comprising processor-readable storage media.

BRIEF DESCRIPTION OF THE DRAWINGS

FIGS. 3B through 3D illustrate a number of exemplary outputs of the feature engineering stage of FIG. 3A in further detail, according to some embodiments;

FIG. 5A illustrates exemplary pseudo code for a multi-variate logistic regression process employed by a layer in FIG. 2, according to one embodiment of the disclosure;

FIGS. 5B and 5C illustrate exemplary sets of inputs and outputs, respectively, for the multi-variate logistic regression process of FIG. 5A, according to some embodiments;

FIG. 6A illustrates exemplary pseudo code for an XG Boost process, employed by a layer of FIG. 2, according to one embodiment of the disclosure;

FIG. 8A illustrates exemplary pseudo code for an Auto Regressive Integrated Moving Average (ARIMA) process, employed by yet another layer of FIG. 2, according to one embodiment of the disclosure;

FIGS. 8B and 8C illustrate exemplary sets of inputs and outputs, respectively, for the ARIMA process of FIG. 8A, according to some embodiments;

FIG. 9A illustrates exemplary pseudo code for an ensemble process employed by a layer in FIG. 2, according to one embodiment of the disclosure;

DETAILED DESCRIPTION

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods and apparatus for multi-model prediction and resolution of order issues.

In one or more embodiments, issues that may delay an e-commerce order are predicted by obtaining features of the e-commerce order; and processing the obtained features using a multi-model predictor to predict the issues that may delay the e-commerce order. In some embodiments, the multi-model predictor comprises at least one model that determines a probability that the e-commerce order will be delayed and a second model that determines a probability that the e-commerce order will be delayed for various predefined order issue types (e.g., predicting, in advance, a possible sequence of each hold type that may occur for the order). A combined output is optionally provided indicating a likelihood of the issues that may delay the e-commerce order. In this manner, failures in validation and other issues can be proactively addressed to reduce order delays.

One or more embodiments of the disclosure process customer information, product information and payment information associated with a given order, as well as historical transactional data, to generate a score indicating a probability that an order will fail in a particular validation test or otherwise be delayed. In some embodiments, evaluation of the historical records allows solutions to be suggested to avoid, mitigate and/or solve a particular issue (e.g., actions to take to address the order by looking at prior application logs and sequences of steps that were previously taken to resolve similar issues). A feedback loop is optionally provided to sales representatives to notify them, at the time a given order is placed or processed, of the issues that may be faced with the given order and suggestions of how to rectify and/or mitigate the identified order issues.

Figure 1:
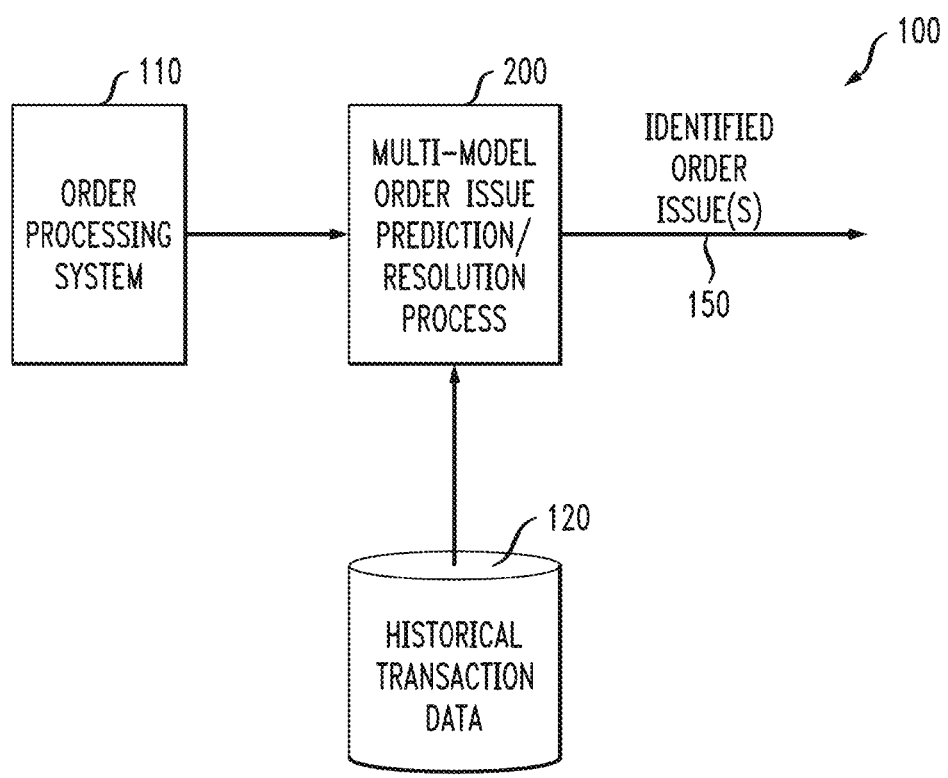
FIG. 1 illustrates an exemplary implementation of a multi-model order prediction system, according to one embodiment of the disclosure.

FIG. 1 illustrates an exemplary implementation of a multi-model order prediction system 100, according to one embodiment of the invention. As shown in FIG. 1, the exemplary multi-model order prediction system 100 initially receives one or more orders from an order processing system 110. The incoming orders are processed by a multi-model order issue prediction/resolution process 200, discussed further below in conjunction with FIG. 2, along with historical transaction data 120, to identify one or more order issues 150 that may cause a given order to be placed on hold, or to otherwise be delayed.

Figure 2:
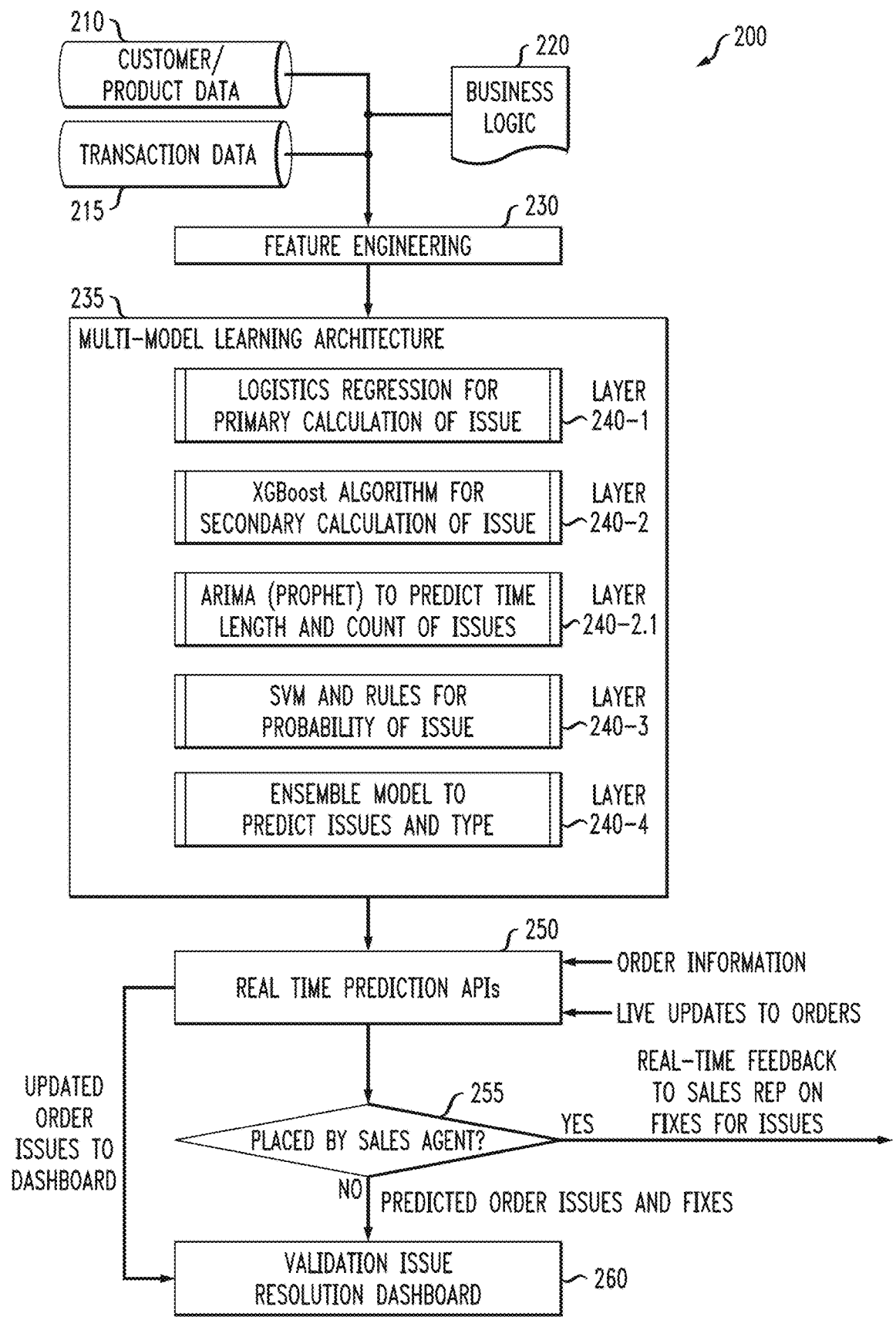
FIG. 2 illustrates an exemplary implementation of the multi-model order issue prediction/resolution process of FIG. 1, according to some embodiments.

FIG. 2 illustrates an exemplary implementation of the multi-model order issue prediction/resolution process 200 of FIG. 1, according to some embodiments. Generally, the exemplary multi-model order issue prediction/resolution process 200 evaluates parameters of incoming e-commerce orders, for example, from order processing system 110, to assess a likelihood that a given order will be placed on hold or otherwise encounter another delay.

As shown in FIG. 2, the exemplary multi-model order issue prediction/resolution process 200 evaluates one or more of customer/product data 210, transaction data 215 and business logic 220 (e.g., validation rules) during a feature engineering stage 230 that is discussed further below in conjunction with FIG. 3A.

A multi-model learning architecture 235 is employed to apply a plurality of learning models to the order data. While the exemplary multi-model learning architecture 235 is illustrated as having tiers, a hierarchical implementation is not required, as would be apparent to a person of ordinary skill in the art. In some embodiments, the various layers of the multi-model learning architecture 235 are trained on labeled historical data and are then used to predict issues for new incoming orders.

The exemplary multi-model learning architecture 235 comprises a first layer 240-1 that determines a probability that a given e-commerce order will be delayed, using, for example, a logistics regression for the primary calculation of an order issue. The first layer 240-1 is discussed further below in conjunction with FIGS. 3 and 5A through 5C.

The exemplary multi-model learning architecture 235 comprises a second layer 240-2 that determines a probability that the given e-commerce order will be delayed for various predefined order issue types, using, for example, an XG Boost algorithm for the secondary calculation of order type issues. In further variations, a gradient Boost algorithm may be employed in layer 240-2. The second layer 240-2 is discussed further below in conjunction with FIGS. 3 and 6A through 6C.

The exemplary multi-model learning architecture 235 comprises another layer 240-2.1 that predicts a number of delay issues for a future time period and/or a cost of said delay issues (e.g., in terms of monetary amount and/or time) for the various predefined order issue types, based on historical data. The layer 240-2.1 may be implemented, for example, as an Auto Regressive Integrated Moving Average (ARIMA) model to predict the count of identified issues and/or the monetary cost or time length of the identified issues. Layer 240-2.1 is discussed further below in conjunction with FIGS. 3 and 8A through 8C.

The exemplary multi-model learning architecture 235 comprises a third layer 240-3 that calculates a mean of the features for a given customer, determines a distance of the mean from a plurality of orders of the given customer, and compares the distances to one or more predefined thresholds. The layer 240-3 may be implemented, for example, as a Support Vector Machine (SVM) using rules for probability of issue. The exemplary SVM layer 240-3 classifies orders and a probability of occurrence of each hold type against the orders. The third layer 240-3 is discussed further below in conjunction with FIGS. 3 and 7A through 7C.

The exemplary multi-model learning architecture 235 comprises a fourth layer 240-4 comprising an ensemble model to predict order issues and type. Generally, the fourth layer 240-4 evaluates the transaction history and related attributes, such as customer master data, sales representative, shipping information, product information and inventory.

As shown in FIG. 2, the exemplary multi-model learning architecture 235 provides the generated prediction information to one or more real time prediction application programming interfaces (APIs) 250 that receive order information from, for example, an order device used by a customer or a sales agent and live updates to orders, for example, from an order processing pipeline. The exemplary real time prediction APIs 250 provide updated order issues to a validation issue resolution dashboard 260, as discussed further below in conjunction with FIG. 4.

A test is performed during step 255 to determine if the order was placed by a sales agent. If the order was placed by a sales agent, real-time feedback is provided to a sales representative (and optionally to the customer) on fixes for order issues. The feedback may comprise, for example, (i) feedback to one or more of a customer, a sales agent and an order processing device regarding one or more orders that are delayed; (ii) recommended resolutions of delayed orders, based on an analysis of historical transaction data; and (iii) one or more order processing channels to be optimized.

In the exemplary embodiment of FIG. 2, if an order was not placed by a sales agent, then the predicted order issues and fixes are provided to the validation issue resolution dashboard 260, as discussed further below in conjunction with FIG. 4.

Figure 3A:
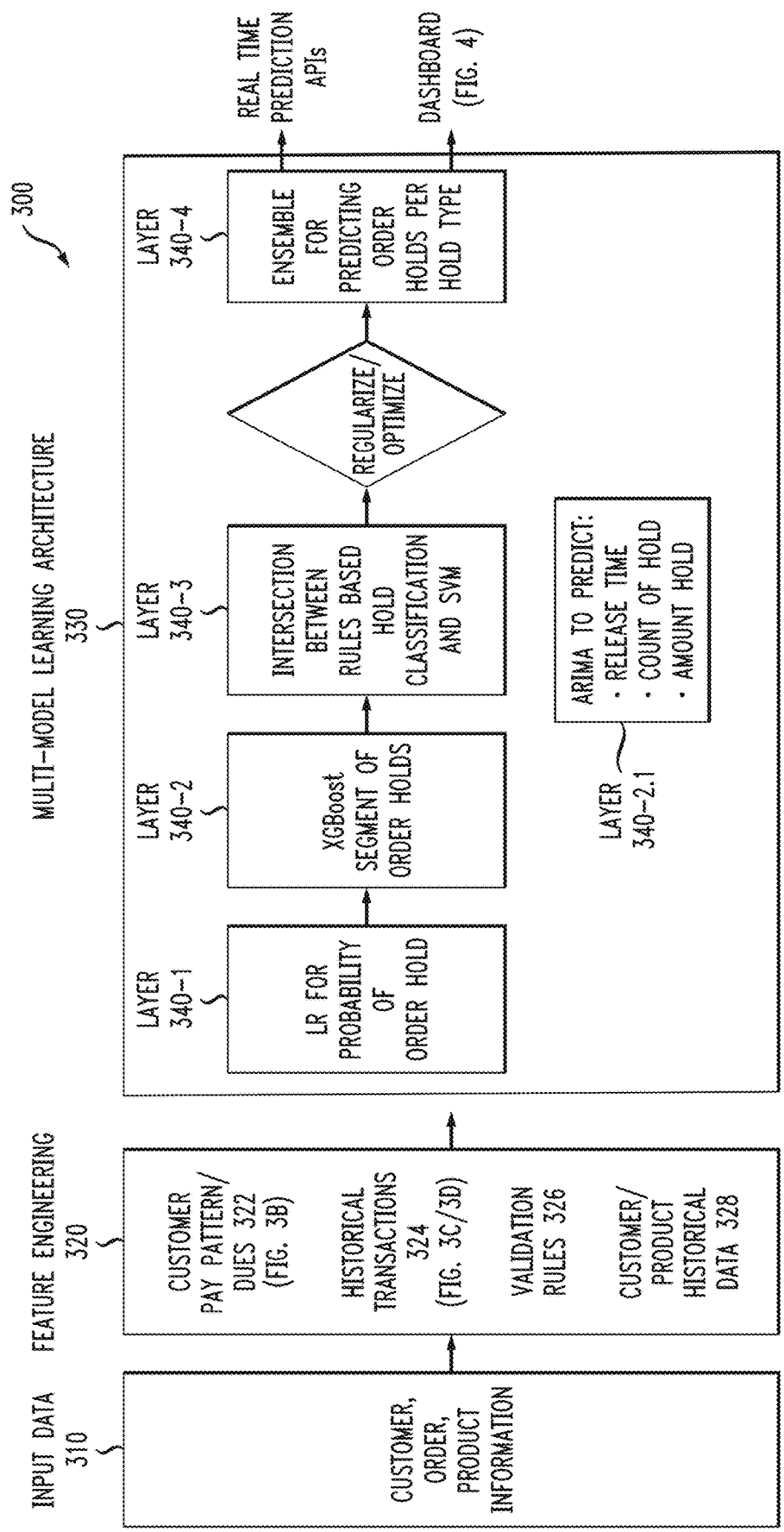
FIG. 3A illustrates an exemplary multi-model order issue prediction/resolution system, according to one embodiment of the disclosure.

FIG. 3A illustrates an exemplary multi-model order issue prediction/resolution system 300, according to one embodiment of the disclosure. As shown in FIG. 3A, the input data 310 comprises customer information, order information and product information. For example, the customer information may comprise a credit risk associated with a customer, or whether a customer has reached his or her credit limit. The product information may include pricing and product availability (e.g., whether a lead time for the product is experiencing a spike). The order information may comprise whether a sales representative is active and valid. Historical transactional data may also be processed.

As shown in FIG. 3A, the input data 310 is applied to a feature engineering stage 320 that generates customer pay pattern/dues 322, as discussed further below in conjunction with FIG. 3B; historical transactions 324, as discussed further below in conjunction with FIGS. 3C and 3D, validation rules 326 and customer/product historical data 328 (e.g., customer attributes such as address, location, region, state, country, customer delivery type, payment terms, risk class, credit score, credit balance, and back end company; and product information such as product hierarchy, availability and end of life of product).

The exemplary multi-model order issue prediction/resolution system 300 further comprises a multi-model learning architecture 330, in a similar manner as FIG. 2. The multi-model learning architecture 330 comprises layer 340-1 that determines a probability that a given e-commerce order will be delayed (e.g., using logistics regression); layer 340-2 that determines a probability that the given e-commerce order will be delayed for various predefined order issue types (e.g., using an XG Boost algorithm or a gradient boost technique); layer 340-2.1 that predicts a number of delay issues for a future time period and/or a cost of said delay issues for the various predefined order issue types (e.g., using as ARIMA model); layer 340-3 that calculates a mean of the features for a given customer, determines a distance of the mean from a plurality of orders of the given customer, and compares the distances to one or more predefined thresholds (e.g., using an SVM and rules for probability of issue); and layer 340-4 comprising an ensemble model to predict order issues and type. As shown in FIG. 3A, the output of the SVM layer 340-3 is applied to an optional regularize/optimize stage before being applied to the ensemble layer 340-4.

The exemplary multi-model order issue prediction/resolution system 300 provides the prediction outputs to the real time prediction APIs and/or a dashboard (FIG. 4), in a similar manner as FIG. 2.

FIGS. 3B through 3D illustrate a number of exemplary outputs of the feature engineering stage 320 of FIG. 3A in further detail, according to some embodiments. FIG. 3B illustrates exemplary account receivables data 350 comprising customer invoices related payments, status of the payment and payment date details. To identify past payment holds, the transactions in the account receivables data 350 are processed to evaluate the past payment behavior of a customer.

FIGS. 3C and 3D illustrate exemplary transaction records 360 and exemplary transaction hold types 370, respectively, according to an embodiment. The transaction and hold type records 360, 370 comprise purchase identifier information, with attributes such as customer, product, sales representative, location, payment channel, and amount, and the respective hold types that these orders encountered.

Figure 4:
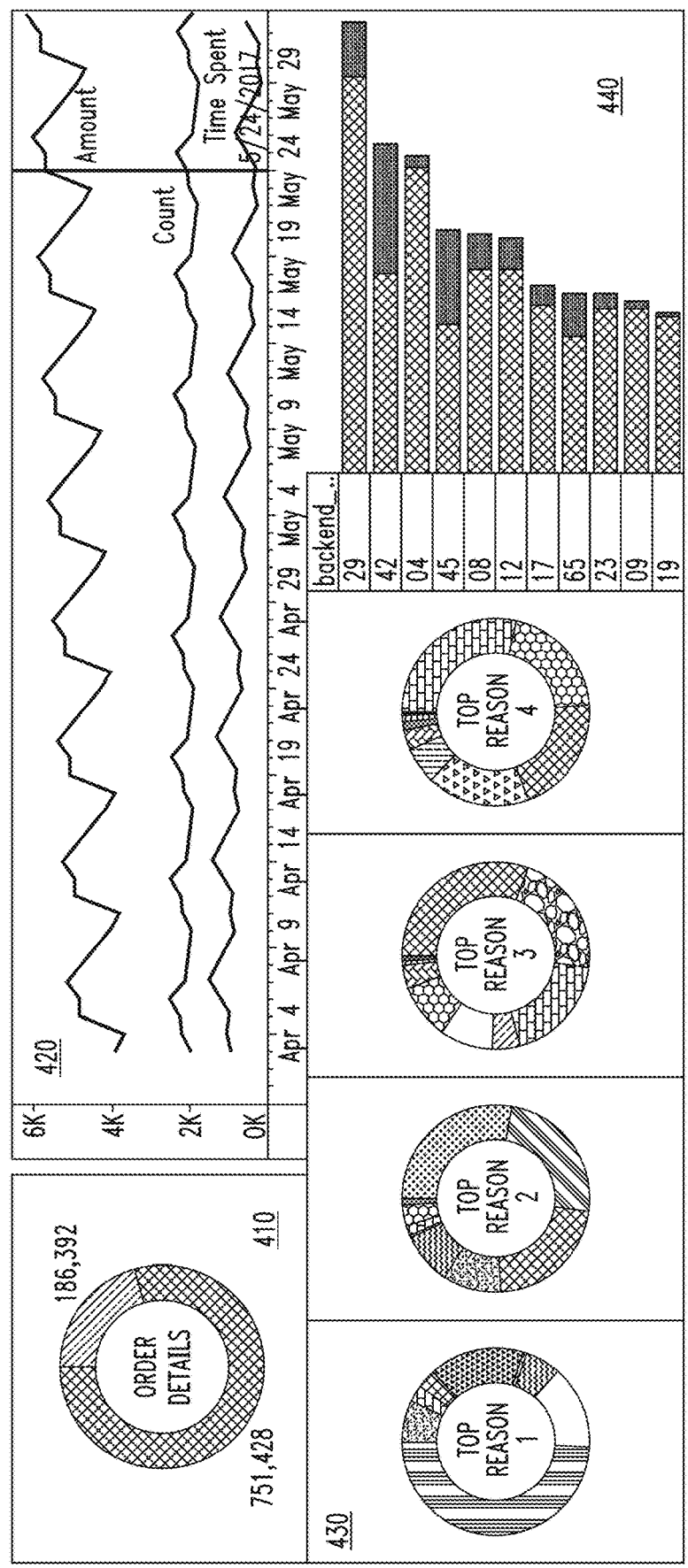
FIG. 4 illustrates an exemplary issue resolution dashboard, according to one embodiment.

FIG. 4 illustrates an exemplary issue resolution dashboard 400, according to one embodiment. As shown in FIG. 4, the exemplary issue resolution dashboard 400 comprises a first panel 410 providing an overview on orders that are on hold and orders that are not delayed. In addition, another panel 420 conveys the prediction of the dollar amount, number and time spent on delayed orders.

In addition, a panel 430 conveys the current top N reasons for delayed orders. A panel 440 conveys the order status for a plurality of backend categories. Panel 450 conveys the current status of each pending order. Finally, an exemplary panel 470 conveys various indicated parameters for each customer associated with orders currently being processed.

FIG. 5A illustrates exemplary pseudo code for a multivariate logistic regression process 500 employed by layer 240-1, according to one embodiment of the disclosure. As noted above, layer 240-1 determines a probability that a given e-commerce order will be delayed, using, for example, a logistics regression for the primary calculation of an order issue. Generally, the training of layer 240-1 involves training over labelled historical data to learn patterns and coefficients (B values in FIG. 5A) of the model 240-1. For each input parameter, the training of layer 240-1 determines how much that the parameter influenced past orders that went on hold.

FIG. 5B illustrates an exemplary set of logistic regression inputs 530, according to an embodiment. As shown in FIG. 5B, the inputs 530 comprise various parameters of each particular order, such as customer number, tax amount and number of past credit card failures for the corresponding customer.

FIG. 5C illustrates an exemplary set of logistic regression outputs 560, according to an embodiment. As shown in FIG. 5C, the outputs indicate a probability of going on hold for each particular order.

FIG. 6A illustrates exemplary pseudo code for a XG Boost process 600, employed by layer 240-2, according to one embodiment of the disclosure. As noted above, layer 240-2 determines a probability that the given e-commerce order will be delayed for various predefined order issue types, using, for example, the XG Boost algorithm or the gradient boost technique for the secondary calculation of order type issues. FIG. 6A develops an example for holds based on tax issues.

Likewise, holds based on problems with lead time or expected delivery date would be processed as follows:

$$\text{Lead\_Time\_indicator} = B0 + B1 \text{ (product)} + B2 \text{ (ship\_type)} + B3 \text{ (route)},$$

as would be apparent to a person of ordinary skill in the art (e.g., which product is being shipped, shipping type (e.g., like air, sea or ground) and along which route based on connecting points between different countries).

Further, holds based on problems with past payment would be processed as follows:

$$\text{Past\_Payment} = B0 + B1 (\text{customer\_number}) + B2 (\text{payment\_days}) + B3 \text{ (product)},$$

as would be apparent to a person of ordinary skill in the art.

Figures 6B, 6C:
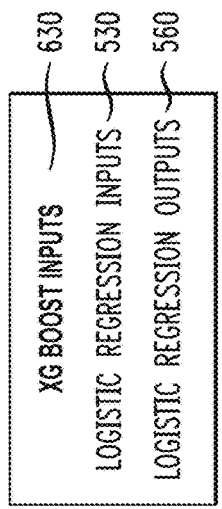
FIGS. 6B and 6C illustrate exemplary sets of inputs and outputs, respectively, for the XG Boost process of FIG. 6A, according to some embodiments.

FIG. 6B illustrates an exemplary set of XG Boost inputs 630, according to one embodiment. Generally, the XG Boost inputs 630 comprise the same inputs as the prior layer, plus the output of the prior layer. In particular, the XG Boost inputs 630 comprise the logistic regression inputs 530 and outputs 560.

FIG. 6C illustrates an exemplary set of XG Boost outputs 660, according to one embodiment of the disclosure. As shown in FIG. 6C, the exemplary XG Boost outputs 660 comprise, for each order, whether the order is predicted to have a hold for each hold type (binary values 0/1 indicating whether there is a hold of the given hold type).

Figure 7A:
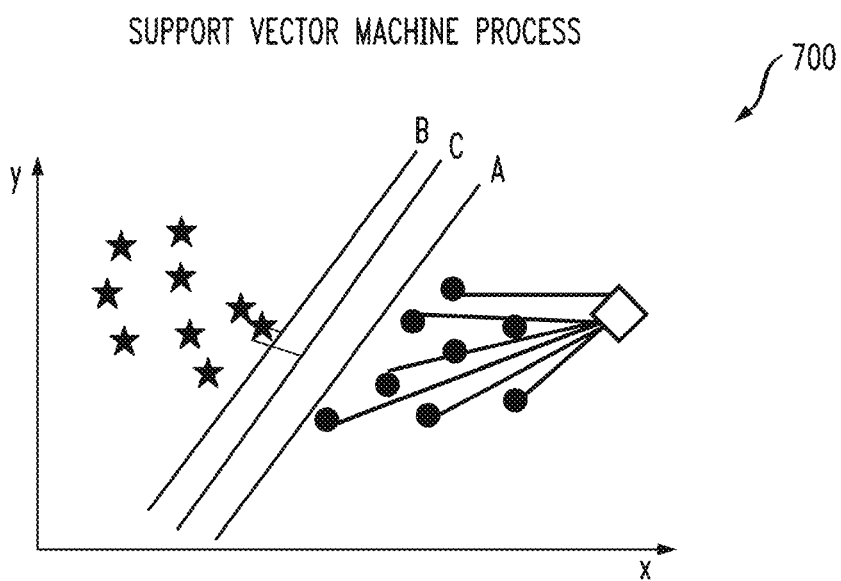
FIG. 7A illustrates exemplary pseudo code for a support vector machine (SVM) process, employed by another layer of FIG. 2, according to one embodiment of the disclosure.

FIG. 7A illustrates exemplary pseudo code for an SVM process 700, employed by layer 240-3, according to one embodiment of the disclosure. As noted above, layer 240-3 employs an SVM and rules to determine the probability of a hold issue. In particular, layer 240-3 calculates a mean of the features for a given customer, determines a distance of the mean from a plurality of orders of the given customer, and compares the distances to one or more predefined thresholds (e.g., for each hold type, a distance of each order from the mean is indicated).

Figures 7B, 7C:
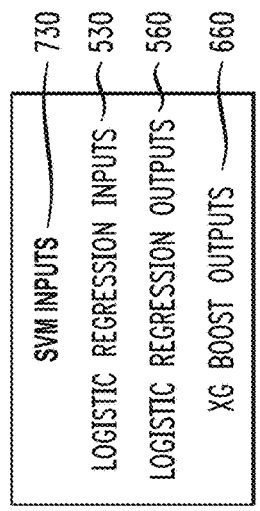
FIGS. 7B and 7C illustrate exemplary sets of inputs and outputs, respectively, for the SVM process of FIG. 7A, according to some embodiments.

FIG. 7B illustrates an exemplary set of SVM inputs 730, according to one embodiment. The exemplary SVM inputs 730 comprise the logistic regression inputs 530, logistic regression outputs 560, and the XG Boost outputs 660.

FIG. 7C illustrates an exemplary set of SVM outputs 760, according to one embodiment of the disclosure. In the exemplary embodiment, the SVM outputs 760 are normalized between 0 and 1, and if the value for a given hold type exceeds a predefined threshold (such as 0.5), the order is likely to go on hold.

FIG. 8A illustrates exemplary pseudo code for an ARIMA process 800, employed by layer 240-2.1, according to one embodiment of the disclosure. As noted above, layer 240-2.1 predicts a number of delay issues for a future time period and/or a cost of said delay issues (e.g., in terms of monetary amount and/or time) for the various predefined order issue types, based on historical data. The generated predictions often correlate with seasonality and trends.

FIG. 8B illustrates an exemplary set of ARIMA inputs 830, according to one embodiment. The inputs 830 comprise historical data (type=actual data), where each row indicates the time spent, monetary amount spent and order count, for particular hold types on particular days.

FIG. 8C illustrates an exemplary set of ARIMA outputs 860, according to one embodiment of the disclosure. The outputs 860 comprise predicted data (type=predicted data), where each row indicates the predicted time spent, predicted monetary amount spent and predicted order count, for particular hold types on particular days.

FIG. 9A illustrates exemplary pseudo code for an ensemble process 900 employed by layer 240-4, according to one embodiment of the disclosure. As noted above, layer 240-4 evaluates the transaction history and related attributes, such as customer master data, sales representative, shipping information, product information and inventory. The ensemble process 900 combines the outputs of other models, for example, using a voting technique, e.g., for display on the dashboard 400 (FIG. 4).

Figures 9B, 9C:
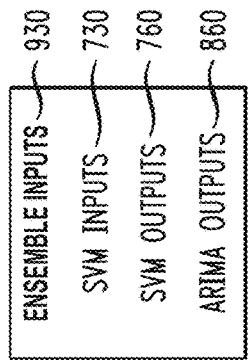
FIGS. 9B and 9C illustrate exemplary sets of inputs and outputs, respectively, for the ensemble process of FIG. 9A, according to some embodiments.

FIG. 9B illustrates an exemplary set of ensemble inputs 930 according to one embodiment. As shown in FIG. 9B, the exemplary inputs 930 comprise the SVM inputs 730 and outputs 760, and the ARIMA outputs 860. FIG. 9C illustrates an exemplary set of ensemble outputs 960 according to one embodiment of the disclosure. As shown in FIG. 9C, the exemplary ensemble outputs 960 comprise normalized values for particular hold types, that can be compared to predefined thresholds to generate predictions.

The disclosed order issue prediction tools can optionally be integrated with a sales tool so that a sales executive can see if any issues will be encountered with particular orders and make appropriate changes, as an order is placed and/or processed. In one or more embodiments, the disclosed techniques provide a closed feedback loop, plugging into sales and operations pipelines to ensure that analytics are not separate from the pipelines. In addition, the exemplary disclosed techniques optionally provide statistics on common problem areas, such as fraudulent customers and credit cards that are often rejected. Further, the exemplary disclosed techniques optionally identify order processing channels that need to be optimized, such as validations that take too long and/or are error-prone.

The predictions generated by the exemplary tools become increasingly accurate with additional data being accumulated into the system, which allows the tools to be used for future time periods, since multiple insights are obtained for different types of order holds, prior to an order flowing into an order system.

In one or more embodiments, the disclosed system operates as follows:

Scenario 1: Order Placed by Customer:
1. Order is placed on a sales tool—customer and payment information is entered, products are chosen.
2. The multi-model order prediction system 100 receives information on a new order and predicts the issues the order will face and the probability that those issues will be faced, in the manner described above. In some embodiments, a notification is received by the multi-model order prediction system 100 for a new order, which runs through the disclosed algorithms to determine issues that the order will face and the probability that those issues will be faced. (The exemplary multi-model order prediction system 100 utilizes historical transactional data, customer information, product information and payment information, as noted above, in one or more embodiments).
3. The multi-model order prediction system 100 looks at the historical records of similar issues (if they exist) and identifies the best method(s) to rectify the potential issue(s).
4. Issue prediction and any recommended solutions are sent to an issue resolution dashboard and operational executives are optionally notified. Using results from steps 2 and 3 (e.g., the predicted issues that the order will face, the probability of those issues and the suggested approach to fix the issues), the data is sent back to a validation resolution dashboard (in the case of customer submitted orders).
5. The validation-resolution operator is notified of the issue proactively and is able to make changes beforehand, thereby reducing order delays (and hence reducing the likelihood of cancellations due to order delays and loss of revenue, while also aiding in customer satisfaction and building brand image).
6. As the order data is updated, the multi-model order prediction system 100 is notified and new issues, if present, will also be updated onto the dashboard.

Scenario 2: Order Placed by a Sales Representative:
1. Order is placed on a sales tool by a sales agent—customer and payment information is entered, products are chosen. As each data point is entered, a change in form data is detected, and a call is made to the multi-model order prediction system 100, in some embodiments.
2. The multi-model order prediction system 100 receives information on a new order and predicts the issues the order will face and the probability that those issues will be faced. In some embodiments, a notification is received by the multi-model order prediction system 100 for a new order, which runs through the disclosed algorithms to determine, with the given data, those issues that the order will face and the probability that those issues will be faced. (As noted above, in one or more embodiments, the multi-model order prediction system 100 utilizes historical transactional data, customer information, product information and payment information).

3. The multi-model order prediction system 100 evaluates the historical records of similar issues (if they exist) and identifies the best method(s) to rectify those issue(s).
4. Using results from steps 2 and 3 (e.g., the predicted issues that the order will face, the probability of those issues and the suggested approach to fix the issues), the data is sent as a suggestion to the sales tool.
5. Issue predictions and proposed solutions are sent back to sales tool so that the sales representative can potentially proactively fix the issue. The sales representative is notified of the issue proactively and is able to make changes beforehand, potentially reducing order delays (and hence reducing the likelihood of cancellation due to order delays and of loss of revenue, while aiding in customer satisfaction and building brand image).
6. As the order data is updated, the multi-model order prediction system 100 is notified and new issues, if present, will also be updated onto the sales tool.

In one or more embodiments, the order issue prediction techniques described herein are iterative in nature, such that a prediction can be updated as new data for a given order becomes available.

Among other benefits, the disclosed multi-model order issue prediction techniques described herein proactively address order holds to keep the orders on track and to reduce delays in order delivery, thereby improving customer satisfaction and brand image. In one or more embodiments, the order issue prediction techniques described herein provide support for sales executives to ensure a smooth transition of orders through each validation stage.

One or more embodiments of the disclosure provide improved methods and apparatus for multi-model order issue prediction and resolution. The foregoing applications and associated embodiments should be considered as illustrative only, and numerous other embodiments can be configured using the techniques disclosed herein, in a wide variety of different applications.

It should also be understood that the disclosed multi-model prediction techniques, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for predicting and resolving order issues may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a PaaS offering, although numerous alternative arrangements are possible.

Some illustrative embodiments of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components of the multi-model order prediction system 100 are illustratively implemented for use by tenants of such a multi-tenant environment.

Cloud infrastructure as disclosed herein can include cloud-based systems such as Amazon Web Services (AWS), Google Cloud Platform (GCP) and Microsoft Azure. Virtual machines provided in such systems can be used to implement at least portions of a multi-model order prediction system in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 10 and 11. These platforms may also be used to implement at least portions of other information processing systems in other embodiments.

Figure 10:
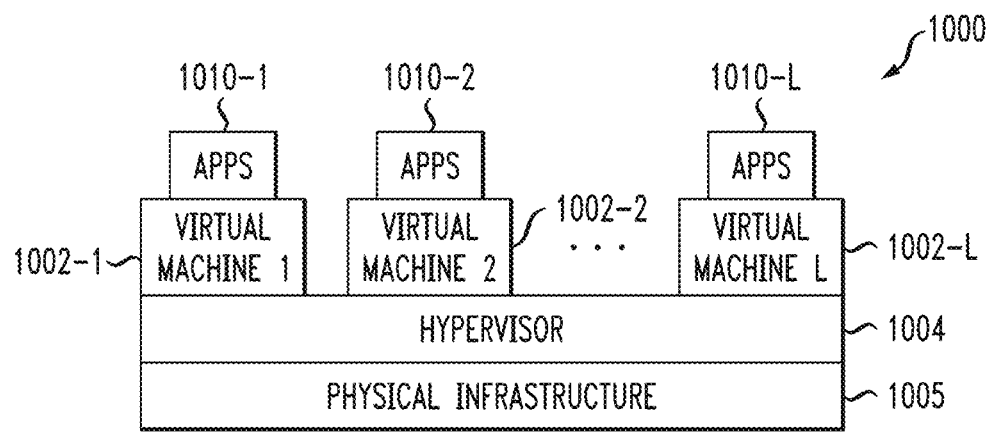
FIG. 10 illustrates an exemplary processing platform that may be used to implement at least a portion of one or more embodiments of the disclosure comprising a cloud infrastructure.

Referring now to FIG. 10, one possible processing platform that may be used to implement at least a portion of one or more embodiments of the disclosure comprises cloud infrastructure 1000. The cloud infrastructure 1000 in this exemplary processing platform comprises virtual machines (VMs) 1002-1, 1002-2, . . . 1002-L implemented using a hypervisor 1004. The hypervisor 1004 runs on physical infrastructure 1005. The cloud infrastructure 1000 further comprises sets of applications 1010-1, 1010-2, . . . 1010-L running on respective ones of the virtual machines 1002-1, 1002-2, . . . 1002-L under the control of the hypervisor 1004.

The cloud infrastructure 1000 may encompass the entire given system or only portions of that given system, such as one or more of client, servers, controllers, or computing devices in the system.

Although only a single hypervisor 1004 is shown in the embodiment of FIG. 10, the system may of course include multiple hypervisors each providing a set of virtual machines using at least one underlying physical machine. Different sets of virtual machines provided by one or more hypervisors may be utilized in configuring multiple instances of various components of the system.

An example of a commercially available hypervisor platform that may be used to implement hypervisor 1004 and possibly other portions of the system in one or more embodiments of the disclosure is the VMware® vSphere™ which may have an associated virtual infrastructure management system, such as the VMware® vCenter™. As another example, portions of a given processing platform in some embodiments can comprise converged infrastructure such as VxRail™, VxRack™, VxBlock™, or Vblock® converged infrastructure commercially available from VCE, the Virtual Computing Environment Company, now the Converged Platform and Solutions Division of Dell EMC of Hopkinton, Mass. The underlying physical machines may comprise one or more distributed processing platforms that include storage products.

Particular types of storage products that can be used in implementing a given storage system of the multi-model order prediction system 100 in an illustrative embodiment include VNX® and Symmetrix VMAX® storage arrays, software-defined storage products such as ScaleIO™ and ViPR®, all-flash and hybrid flash storage arrays such as Unity™, cloud storage products such as Elastic Cloud Storage (ECS), object-based storage products such as Atmos®, scale-out all-flash storage arrays such as XtremIO™, and scale-out NAS clusters comprising Isilon® platform nodes and associated accelerators, all from Dell EMC. Combinations of multiple ones of these and other storage products can also be used in implementing a given storage system in an illustrative embodiment.

In some embodiments, the cloud infrastructure additionally or alternatively comprises a plurality of containers implemented using container host devices. For example, a given container of cloud infrastructure illustratively comprises a Docker container or other type of LXC. The containers may be associated with respective tenants of a multi-tenant environment of the system, although in other embodiments a given tenant can have multiple containers. The containers may be utilized to implement a variety of different types of functionality within the system. For example, containers can be used to implement respective compute nodes or cloud storage nodes of a cloud computing and storage system. The compute nodes or storage nodes may be associated with respective cloud tenants of a multi-tenant environment of system. Containers may be used in combination with other virtualization infrastructure such as virtual machines implemented using a hypervisor.

As is apparent from the above, one or more of the processing modules or other components of the disclosed multi-model order prediction system may each run on a computer, server, storage device or other processing platform element. A given such element may be viewed as an example of what is more generally referred to herein as a "processing device." The cloud infrastructure 1000 shown in FIG. 10 may represent at least a portion of one processing platform.

Figure 11:
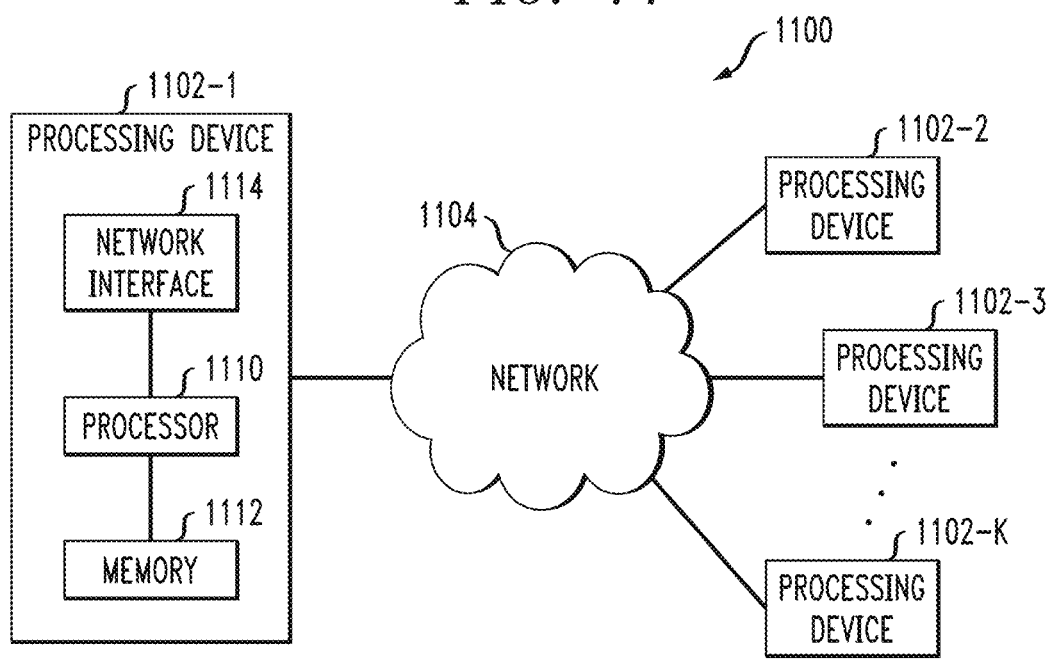
FIG. 11 illustrates another exemplary processing platform that may be used to implement at least a portion of one or more embodiments of the disclosure.

Another example of a processing platform is processing platform 1100 shown in FIG. 11. The processing platform 1100 in this embodiment comprises at least a portion of the given system and includes a plurality of processing devices, denoted 1102-1, 1102-2, 1102-3, . . . 1102-K, which communicate with one another over a network 1104. The network 1104 may comprise any type of network, such as a wireless area network (WAN), a local area network (LAN), a satellite network, a telephone or cable network, a cellular network, a wireless network such as WiFi or WiMAX, or various portions or combinations of these and other types of networks.

The processing device 1102-1 in the processing platform 1100 comprises a processor 1110 coupled to a memory 1112. The processor 1110 may comprise a microprocessor, a microcontroller, an application specific integrated circuit (ASIC), a field programmable gate array (FPGA) or other type of processing circuitry, as well as portions or combinations of such circuitry elements, and the memory 1112, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1102-1 is network interface circuitry 1114, which is used to interface the processing device with the network 1104 and other system components, and may comprise conventional transceivers.

The other processing devices 1102 of the processing platform 1100 are assumed to be configured in a manner similar to that shown for processing device 1102-1 in the figure.

Again, the particular processing platform 1100 shown in the figure is presented by way of example only, and the given system may include additional or alternative processing platforms, as well as numerous distinct processing platforms in any combination, with each such platform comprising one or more computers, storage devices or other processing devices.

Multiple elements of system may be collectively implemented on a common processing platform of the type shown in FIG. 10 or 11, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in FIGS. 2, 3, 5A, 6A, 7A, 8A and 9A are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method for predicting one or more issues that will delay an electronic commerce order, comprising:
    obtaining a plurality of features of said electronic commerce order;
    processing, using at least one processing device, said plurality of features using a multi-model predictor to predict said one or more issues that will delay said electronic commerce order, wherein said multi-model predictor comprises a first model that determines a probability that said electronic commerce order will be delayed and a second model that determines a probability that said electronic commerce order will be delayed for each of a plurality of different predefined order issue types; and
    aggregating an output of said first and second models to provide a likelihood of said one or more issues that will delay said electronic commerce order.

2. The method of claim 1, wherein said multi-model predictor further comprises a prediction model that predicts one or more of a number of delay issues for a future time period and a cost of said delay issues for said plurality of different predefined order issue types based on historical data.

3. The method of claim 2, wherein said prediction model comprises an autoregressive integrated moving average model.

4. The method of claim 1, wherein said multi-model predictor further comprises a support vector machine model that calculates a mean of said plurality of features for a given customer, determines a distance of the mean from a plurality of orders of the given customer, and compares the distances to one or more predefined thresholds.

5. The method of claim 1, wherein said first model comprises a logistic regression model.

6. The method of claim 1, wherein said second model comprises one or more of an XG Boost algorithm and a gradient Boost algorithm.

7. The method of claim 1, further comprising the step of providing feedback to one or more of a customer, a sales agent and an order processing device regarding one or more orders that are delayed.

8. The method of claim 1, further comprising the step of recommending one or more resolutions of the one or more issues that will delay the electronic commerce order based on an analysis of historical transaction data.

9. The method of claim 1, further comprising the step of identifying one or more order processing channels to be optimized.

10. A system for predicting one or more issues that will delay an electronic commerce order, comprising:
    a memory; and
    at least one processing device, coupled to the memory, operative to implement the following steps:
    obtaining a plurality of features of said electronic commerce order;
    processing, using at least one processing device, said plurality of features using a multi-model predictor to predict said one or more issues that will delay said electronic commerce order, wherein said multi-model predictor comprises a first model that determines a probability that said electronic commerce order will be delayed and a second model that determines a probability that said electronic commerce order will be delayed for each of a plurality of different predefined order issue types; and
    aggregating an output of said first and second models to provide a likelihood of said one or more issues that will delay said electronic commerce order.

11. The system of claim 10, wherein said multi-model predictor further comprises a prediction model that predicts one or more of a number of delay issues for a future time period and a cost of said delay issues for said plurality of different predefined order issue types based on historical data.

12. The system of claim 10, wherein said multi-model predictor further comprises a support vector machine model that calculates a mean of said plurality of features for a given customer, determines a distance of the mean from a plurality of orders of the given customer, and compares the distances to one or more predefined thresholds.

13. The system of claim 10, wherein said first model comprises a logistic regression model and wherein said second model comprises one or more of an XG Boost algorithm and a gradient Boost algorithm.

14. The system of claim 10, further comprising the step of recommending one or more resolutions of the one or more issues that will delay the electronic commerce order based on an analysis of historical transaction data.

15. The system of claim 10, further comprising the step of identifying one or more order processing channels to be optimized.

16. A computer program product for predicting one or more issues that will delay an electronic commerce order, comprising a tangible machine-readable storage medium having encoded therein executable code of one or more software programs, wherein the one or more software programs when executed by at least one processing device perform the following steps:
    obtaining a plurality of features of said electronic commerce order;
    processing, using at least one processing device, said plurality of features using a multi-model predictor to predict said one or more issues that will delay said electronic commerce order, wherein said multi-model predictor comprises a first model that determines a probability that said electronic commerce order will be delayed and a second model that determines a probability that said electronic commerce order will be delayed for each of a plurality of different predefined order issue types; and aggregating an output of said first and second models to provide a likelihood of said one or more issues that will delay said electronic commerce order.

17. The computer program product of claim 16, wherein said multi-model predictor further comprises a prediction model that predicts one or more of a number of delay issues for a future time period and a cost of said delay issues for said plurality of different predefined order issue types based on historical data.

18. The computer program product of claim 16, wherein said multi-model predictor further comprises a support vector machine model that calculates a mean of said plurality of features for a given customer, determines a distance of the mean from a plurality of orders of the given customer, and compares the distances to one or more predefined thresholds.

19. The computer program product of claim 16, wherein said first model comprises a logistic regression model and wherein said second model comprises one or more of an XG Boost algorithm and a gradient Boost algorithm.

20. The computer program product of claim 16, further comprising the step of recommending one or more resolutions of the one or more issues that will delay the electronic commerce order based on an analysis of historical transaction data.

* * * * *